United States Patent [19]

Friedman

[11] 3,994,344
[45] Nov. 30, 1976

[54] METHOD FOR RECOVERY OF ACIDIC CRUDE OILS

[75] Inventor: Robert H. Friedman, Houston, Tex.

[73] Assignee: Getty Oil Company, Los Angeles, Calif.

[22] Filed: Dec. 26, 1974

[21] Appl. No.: 536,435

[52] U.S. Cl. .............................. 166/270; 166/274
[51] Int. Cl.$^2$.................. E21B 43/20; E21B 43/22
[58] Field of Search ........... 166/270, 274, 275, 300, 166/305 R; 252/8.55 D

[56] References Cited
UNITED STATES PATENTS

| | | | |
|---|---|---|---|
| 2,954,825 | 10/1960 | Bernard | 166/270 |
| 3,047,062 | 7/1962 | Meadors | 166/270 |
| 3,111,984 | 11/1963 | Reisberg | 166/270 |
| 3,174,542 | 3/1965 | Reisberg | 166/270 |
| 3,330,347 | 7/1967 | Brown et al. | 166/270 |
| 3,344,858 | 10/1967 | Gilchrist et al. | 166/270 |
| 3,347,789 | 10/1967 | Dickson et al. | 166/275 |
| 3,464,492 | 9/1969 | Friedman | 166/270 |
| 3,472,319 | 10/1969 | McAuliffe | 166/270 |

*Primary Examiner*—Price C. Faw, Jr.
*Assistant Examiner*—George A. Suchfield
*Attorney, Agent, or Firm*—Arnold, White & Durkee

[57] ABSTRACT

Aqueous solutions comprising polyethylenimine as the active ingredient thereof are injected into an underground formation having an acidic crude oil therein. The polyethylenimine reacts with the nonhydrocarbon constituents in the crude oil to form a surface-active material. The surfactant emulsifies in the oil to form a grease-like barrier layer, and the crude may then be pushed by a suitable pushing agent such as water or viscous water from behind the grease barrier, to a producing well from where the crude oil is produced.

17 Claims, No Drawings

METHOD FOR RECOVERY OF ACIDIC CRUDE OILS

BACKGROUND OF THE INVENTION

This invention relates to the recovery of crude oils from subterranean formations, and more particularly to the recovery of such crude oils which are highly acidic in character. The invention is especially directed to the recovery of such acidic crude oils which are highly viscous. By "highly viscous" is meant those crudes having a viscosity of at least on the order of about 1000 cp at 75° F. Although the invention finds its primary utility in connection with the more viscous crudes, it may also be used in some contexts of use in connection with less viscous crude oils. Other methods may be more economical for the recovery of less viscous crudes, as of the date of this application, but this invention may nevertheless find considerable utility in connection with such less viscous crude oils.

The prior art has repeatedly dealt with attempts to find methods for the more efficient recovery of crude oil, including highly acidic crudes.

However, the high viscosity of heavy acidic crudes prevents their economical production with conventional techniques such as simple water flooding. In the past, it has been thought that such crudes can be economically produced only by certain special techniques such as thermal recovery processes. In the copending application of Robert H. Friedman, Ser. No. 312,674, now U.S. Pat. No. 3,874,453, is disclosed a method for recovery of such crudes which includes the injection into an underground formation containing the crude, of a solution of barium hydroxide, $Ba(OH)_2$. In tests with heavy acidic crudes from the San Joaquin Valley (Potter Zone) of California, such crudes having a viscosity of at least about 1000 cp at 75° F and acid numbers in excess of 2.5, it was found that the injection of the barium hydroxide facilitated significant additional recovery of such crudes. In the above-mentioned application, it was pointed out that it is believed that the barium hydroxide injected into the underground formation reacts with the acid in an acidic crude oil to produce a soap which is highly soluble in oil, and preferentially soluble in oil as compared to water. The barium soap thus formed dissolves in the acidic crude, and this soap then acts with the crude to form a grease-like layer at the soap-crude interface. It is believed that this layer acts as a barrier, and thence pushing the crude from behind this layer is effective to move the crude through the formation. Thus, pushing the crude toward a producing well is effective to allow recovery of the crude from the producing well.

This technique is far superior in many contexts of use to simple water flooding. Water flooding often produces fingers of water through the oil and is ineffective to push the greater amount of the crude to a producing well.

Although the barium hydroxide technique is a great improvement over the prior art in many respects, and for many contexts of use, continuing research has revealed that in other contexts of use it still does not yield the percentage oil recovery which would be desired.

The methods provided by this invention, then, comprise part of a continuing effort to provide better and more efficient ways of recovery of more and more crude oil from underground formations, these techniques being directed primarily toward the recovery of highly acidic crudes.

SUMMARY OF THE INVENTION

Acidic crude oils are recovered by injecting into the crude, in subterranean formations, quantities of an aqueous solution of polyethylenimine. The polyethylenimine, a highly reactive polymeric material, reacts with the acid in the crude to form a surfactant, the resulting surfactant being soluble in oil. The oil-soluble surfactant thus formed emulsifies in the acidic crude, forming a grease-like barrier layer. A pushing agent may then be injected through an injection well to drive the crude, from behind the grease-like barrier, toward a producing well from where the oil is produced. Laboratory tests have revealed that although polyethylenimine may be used in conjunction with other basic imine agents for forming the grease-like barrier layer, it is quite satisfactory working alone. Further, the polyethylenimine technique as detailed herein is suitable for the recovery of both highly viscous and less viscous acidic crudes, although it will be understood that less viscous crudes may be more readily produced by conventional (and perhaps more economical) methods.

It is believed that optimum results may be obtained with injection solutions of polyethylenimine having a concentration between 0.05 and 0.1% by weight.

DETAILED DESCRIPTION OF PREFERRED EMBODIMENT

Although the invention may find utility in other contexts of use, it will be explained in terms of injection and production wells, and the movement or flooding of crude oil to be produced toward the vicinity of the production well. As will be understood in the art, "injection well" refers to a well through which reactive materials or flooding materials and the like may be injected into the subterranean formation containing the crude oil to be produced. "Producing well" or "production well" refers to a well from which the crude oil is produced. These terms ae generally used in connection with post-primary recovery methods such as secondary or tertiary recovery methods, but are used herein in their broader sense to refer not only to post-primary techniques but also to primary recovery of petroleum oil. It is possible that the injection well and the producing well may be but a single well.

Polyethylenimine, $(CH_2CH_2NH)_n$, is a highly reactive polymer which exists at room temperatures as a hygroscopic liquid when anhydrous, completely miscible with water and lower alcohols. Polyethylenimine is available commercially in several molecular weights from about 300 to at least about 100,000. Polyethylenimine polymer having a mean molecular weight of about 300 is indicated as PEI-3, polyethylenimine having a mean molecular weight of about 600 is indicated as PEI-6, etc. The viscosity of PEI-3 is about 1000 cp at 25° C, and the pH is about 10.6. PEI-3 is available as a liquid of about 99% purity, and comprises mainly molecules of 5, 6, 7, 8 or 9 units in length. PEI-3 has a density at 76° F of 8.6 lbs./gallon, and a specific gravity of 1.03. PEI-3 and various other polyethylenimine polymers are available from the Dow Chemical Company and other manufacturers.

The viscosity of polyethylenimine polymers having a mean molecular weight of greater than 300 is greater than the viscosity of PEI-3. For instance, PEI-18 has a viscosity at 25° C of about 11,000, and PEI-1,000

(which is a 33% water solution having a pH of 9.8) has a viscosity at 25° C of about 20,000 cp.

Polyethylenimine is highly reactive with a number of functional groups such as acids, aldehydes, ketones, oxides, phenolic hydroxides. Thus, it is reactive with many of the functional groups found in crude oil molecules. Upon reaction of the highly hydrophylic polyethylenimine with a functional group of an organic material, some surface active character is imparted to the original molecule.

Additional information on reactions of polyethylenimines is available in printed literature from the Dow Chemical Company, Midland, Michigan.

Mixtures of polyethylenimine useful in this invention may be made simply by mixing polyethylenimine with water. Since polyethylenimine is an eye irritant, safety glasses should be worn while working with the material, but no other safety precautions are generally necessary.

As pointed out above, this invention may find utility in connection with various types of crude oil, but it is designed primarily for use with those crudes having a high viscosity and high acid number. In general, the methods of the invention were designed for use in connection with crude oils having an acid number of greater than 2.5 and viscosities of at least about 1,000 cp at 75° F. Of these two parameters, the acidic nature of the oil is more important since the invention depends for its utility upon a reaction between the basic polyethylenimine and the acid of the crude oil. The invention finds primary utility in connection with heavy crudes of this nature, since lighter crudes may generally be effectively recovered through the use of more conventional, and more economical, techniques. As will be seen later in this discussion, however, it has been found that the methods of this invention can certainly be used in connection with somewhat less viscous crudes, and if polyethylenimine is reduced from its present cost it may well be that the invention will become more economically feasible even in connection with less viscous acidic crudes.

An example of the heavy crudes for which the invention is believed to be best suited is the crude from the Lost Hills field in central California. Such crudes have acid numbers in excess of 2.5, and viscosities of about 4,000 cp at 75° F.

In accordance with the invention, a solution of polyethylenimine suitable for forming a soap with an acidic crude is provided. In accordance with the preferred embodiment as of the date of this application, the solution of polyethylenimine should be an aqueous solution having a composition of polyethylenimine by weight of between about 0.05% and 0.1%.

The polyethylenimine solution thus provided is injected into one or more injection wells in a quantity operable to react with the formation crude to yield an oilsoluble surfactant. The quantity of polyethylenimine solution injected will depend upon numerous factors including the acidity of the formation crude, the structure and configuration of the formation, the viscosity of the crude, the molecular weight of the polyethylenimine employed, and the relative cost at the time of injection of polyethylenimine and the formation crude.

In general it is believed that it will be desirable to inject a quantity of polyethylenimine no greater than about 0.0005 pore volume, based upon the pore volume of the formation in the area of the producing and injection wells. This amount is based for convenience on 100% PEI. Thus, if the PEI used is of a strength suggested in the preceding paragraphs, namely from about 0.05% to about 0.10%, then from about 1.0 pore volume to about 0.5 pore volume, respectively, would desirably be employed.

The polyethylenimine in the injected solution will react in situ with the nonhydrocarbon functional groups in the crude oil to form a surface active material.

The surfactant thus formed dissolves in the acidic crude, and then acts with the crude to form a greaselike barrier layer at the soap-crude interface. It is believed that this layer acts as a barrier, and pushing the crude from behind this barrier is effective to move the crude through the formation. Pushing the crude toward a producing well is thus effective to allow recovery of the crude from a producing well.

Various means may be employed for pushing the crude from behind the barrier. For example, the crude could be pushed with excess quantities of a polyethylenimine solution, or of another basic solution such as sodium hydroxide solution. However, the expense of the additional polyethylenimine or other base will probably rule out this as an economical practicality.

One desirable flooding or pushing agent behind the barrier layer is water. As is well known in the art, water flooding comprises injecting water under pressure into an injection well, driving oil toward a producing well. Water flooding is used in many applications for recovery of crude oil, but is not satisfactory in many others such as those wherein the viscosity of the crude is so great that the water forms fingers through the crude and is ineffective as a pushing agent.

This fingering of the much less viscous water through the heavy crude may occur even through the grease barrier provided by this invention, in some contexts of use. Thus, better results may be obtained by using a more viscous water, such as a solution of a thickening agent such as carboxymethylcellulose in water, or a fluid such as those disclosed in U.S. Pat. No. 3,800,872.

In many contexts of use, it may be desired, assuming injection of about 0.5 pore volume of polyethylenimine solution, to push with at least about 2, preferably about 2.5 pore volumes, of pushing agent.

Several laboratory experiments have been performed to test the methods outlined above, and these experiments are summarized in the examples which follow. These examples are illustrative only and should not be considered limiting of the scope of the invention.

EXAMPLE I

A prototype reservoir was prepared by packing 20-30 mesh Ottawa sand in a stainless steel tube 18 inches in length and 2 inches in diameter. The temperature of the sand in the prototype reservoir was 80° F throughout the experiment.

Crude oil from the Lost Hills field having a viscosity of about 4,000 cp at 75° F was added to the sand, and the initial oil saturation measured at 0.51 pore volume.

A displacing fluid was prepared comprising a solution of polyethylenimine having an average molecular weight of about 300 (PEI-3) in water, the concentration of the polyethylenimine being 0.10% by weight. The polyethylenimine solution was injected into the tube, at a constant rate of 800 cc/hr., the injected slug measuring 0.53 pore volume. Fluids were recovered through the end of the column with no time delay between injection and production, and, after recovery of the fluids, the final oil saturation of the model was measured. In this instance, the final oil saturation measured 0.28 pore volume, indicating an oil recovery of 0.23 pore volume.

EXAMPLE IB

Example I was repeated, except that the displacing slug was 0.50 instead of 0.53 pore volume.

The initial oil saturation measured 0.51 pore volume and the final oil saturation measured 0.26 pore volume, indicating an oil recovery of 0.25 pore volume.

EXAMPLE II

Example I was repeated, except that the concentration of the PEI-3 was 0.3%, and the injected slug was 0.55 pore volume.

The initial oil saturation was measured at 0.51 pore volume, and the final oil saturation measured at 0.26 pore volume, indicating an oil recovery of 0.25 pore volume.

EXAMPLE III

Example I was repeated, except that the concentration of the PEI-3 was 0.5%, and the injected slug measured 0.50 pore volume.

The initial oil saturation was measured at 0.51 pore volume, and the final oil saturation measured at 0.26 pore volume, indicating an oil recovery of 0.25 pore volume.

As is seen from comparing this example with the previous example, a large increase in the concentration of PEI-3 over that of Example II did not affect the oil recovery.

EXAMPLE IV

Example I was repeated, except that only 0.10 pore volume of 0.1% PEI-3 was injected.

The initial pore volume was measured at 0.50, and the final oil saturation was measured at 0.43 pore volume, indicating an oil recovery of only 0.07 pore volume.

EXAMPLE V

Example I was then repeated using the same concentration but an injected slug of 0.25 pore volume.

The initial oil saturation was measured at 0.50 pore volume, the final oil saturation measured at 0.37 pore volume, indicating an oil recovery of 0.13 pore volume.

EXAMPLE VI

Example I was repeated, except that the concentration of the polyethylenimine was 0.2%, and the injected slug was 0.25 pore volume.

The initial oil saturation measured 0.49 pore volume, the final oil saturation measured 0.31 pore volume, indicating an oil recovery of 0.18 pore volume.

EXAMPLE VII

Example VI was repeated, except that the slug was reduced in size from 0.25 pore volume to 0.10 pore volume.

The initial oil saturation was 0.49 pore volume and the final oil saturation was 0.40 pore volume, indicating an oil recovery of 0.09 pore volume.

EXAMPLE VIII

Example III was repeated, except that the size of the polyethylenimine slug injected was reduced from 0.50 pore volume to 0.19 pore volume.

The initial oil saturation was 0.49 pore volume, the final oil saturation 0.30 pore volume, indicating an oil recovery of 0.19 pore volume.

EXAMPLE IX

Example VIII was repeated, except that the displacing slug was increased from 0.19 pore volume to 0.25 pore volume.

The initial oil saturation was 0.49 pore volume, the final oil saturation 0.28 pore volume, indicating a recovery of 0.21 pore volume.

EXAMPLE X

Example I was repeated, except that the concentration of the polyethylenimine was reduced from 0.10% to 0.05%.

The size of the displacing slug was 0.50 pore volume.

The initial oil saturation was measured at 0.50 pore volume and the final oil saturation was measured at 0.34 pore volume, thus indicating an oil recovery of 0.16 pore volume.

EXAMPLE XI

Example X was repeated, except that the size of the displacing slug was doubled to 1.0 pore volume.

The initial oil saturation was 0.50 pore volume, the final oil saturation 0.34 pore volume, indicating an oil recovery of 0.16 pore volume.

EXAMPLE XII

Example I was repeated, except that the size of the displacing slug was raised to 1.0 pore volume.

The initial oil saturation was 0.49 pore volume, the final oil saturation was 0.24 pore volume, indicating an oil recovery of 0.25 pore volume.

EXAMPLE XIII

Example I was repeated, except that the polyethylenimine used had an average molecular weight of about 600 (PEI-6) and the injected slug was 0.50 pore volume.

The initial oil saturation was 0.50 pore volume, the final oil saturation was measured at 0.26 pore volume, indicating an oil recovery of 0.24 pore volume.

EXAMPLE XIV

Example I was repeated, except that the solution employed a polyethylenimine of an average molecular weight of about 1800 (PEI-18).

The injected slug was 0.50 pore volume, and the initial oil saturation was likewise measured at 0.50 pore volume. The final oil saturation was measured at 0.31 pore volume indicating an oil recovery of 0.19 pore volume.

From Examples XIV and XIII, when compared to Examples I and IB, it may be seen that an increase in the molecular weight of the polyethylenimine used did not result in an increase in oil recovery.

EXAMPLE XV

Example I was repeated, except that the displacing slug measured only 0.25 pore volume, and was injected at a rate of 8.7 cc/hr.

The initial oil saturation measured 0.50 pore volume, the final oil saturation measured 0.36 pore volume, indicating an oil recovery of 0.14 pore volume.

EXAMPLE XVI

Example XV was repeated, except that the rate of injection of the displacing slug was increased to 49.4 cc/hr.

The initial oil saturation measured 0.51 pore volume, the final oil saturation measured 0.37 pore volume, indicating an oil recovery of 0.14 pore volume.

EXAMPLE XVII

Example XV was repeated, except that the rate of injection was increased to 89.6 cc/hr.

The initial oil saturation measured 0.50 pore volume, the final oil saturation measured 0.35 pore volume, indicating an oil recovery of 0.15 pore volume.

It may be seen from the results of Examples XV through XVII that decreasing the slug size while injecting the slug at a slower rate did not result in increased oil recovery but, to the contrary, resulted in considerably decreased oil recovery.

EXAMPLE XVIII

Example VI was repeated, except that the slug size was increased from 0.25 pore volume to 0.5 pore volume. The pH of the solution was measured at 10.1.

The initial oil saturation was measured at 0.51 pore volume, and the final oil saturation was measured at 0.27 pore volume. Thus an oil recovery of 0.24 pore volume was obtained.

EXAMPLE XIX

Example I was repeated, except that the concentration of polyethylenimine was 0.02%, and the displacing slug measured 0.50 pore volume. The pH of the solution was measured at 9.3.

The initial oil saturation measured 0.51 pore volume, and the final oil saturation measured 0.41 pore volume, indicating an oil recovery of 0.10 pore volume.

EXAMPLE XX

Using the same model as used in Example I, an aqueous solution comprisng 160 parts per million sodium hydroxide was prepared as the displacing fluid, and its pH measured at 9.9.

A slug of 0.50 pore volume of the NaOH solution was then injected as in the manner indicated in Example I above.

The initial oil saturation was measured at 0.51 pore volume, and the final oil saturation was measured at 0.45 pore volume, indicating an oil recovery of only 0.06 pore volume.

EXAMPLE XXI

Example XX was repeated, except that the solution comprised 2,000 parts per million sodium hydroxide, and the pH was measured at 12.0.

The initial oil saturation measured 0.50 pore volume, and the final oil saturation measured 0.43 pore volume, indicating an oil recovery of 0.07 pore volume.

In all the above examples, the injection of from 0.10 pore volume to 1.0 pore volume of displacing fluid was followed by water flood for a total injection of 3.0 pore volume.

From the above laboratory experiments, it is believed that polyethylenimine in a dilute solution in water is an especially effective means for the recovery of crude oil with respect to highly acidic, and most especially heavy acidic, crudes.

From these experiments, it is believed that best results from an economic standpoint may be obtained with a solution of polyethylenimine (having an average molecular weight of about 300) in a concentration of between about 0.05% and about 0.01% by weight.

Further, it is concluded that a slug of such polyethylenimine of this concentration should be injected in an amount of something on the order of 0.5 pore volume for best results, based on a PEI-concentration of between 0.05 and 0.1.

As shown in these examples, use of polyethylenimine of a higher molecular weight in solution, use of higher concentrations of polyethylenimine, and use of different slug sizes will also result in improving oil recoveries.

While the invention has been described in terms of embodiments which are believed to represent the best mode of this invention at the time of the application, various changes might be made in the methods herein described without departing from the scope of the invention which is defined by the appended claims.

What is claimed is:

1. A method for recovery of acidic petroleum crude oil from an underground formation having therein at least one injection well and at least one producing well, comprising:
    injecting through an injection well an aqueous solution of polyethylenimine having a mean molecular weight of about 600 or less;
    said polyethylenimine reacting with the acidic crude oil to form an oil-soluble soap, and said soap further reacting with said crude to form a grease-like barrier layer;
    injecting a pushing agent through said injection well to push said crude, from behind said barrier layer, towards said producing well; and
    producing said crude oil through said producing well.

2. The method in accordance with claim 1, wherein said pushing agent is a viscous aqueous solution.

3. The method in accordance with claim 2, wherein said pushing agent is an aqueous solution of carboxymethylcellulose.

4. The method in accordance with claim 1, wherein said pushing agent is water.

5. The method in accordance with claim 1, wherein said polyethylenimine in said aqueous solution has a mean molecular weight of about 300.

6. The method in accordance with claim 5, wherein the concentration of said polyethylenimine solution is from about 0.05% to about 0.10%.

7. The method in accordance with claim 1, wherein the amount of polyethylenimine solution injected is about 0.5 pore volume.

8. The method in accordance with claim 7, wherein injection of about 0.5 pore volume of polyethylenimine solution is followed by injection of about 2.5 pore volumes of water.

9. A method for recovery of acidic petroleum crude oil from an underground formation having therein at least one injection well and at least one producing well, comprising:
    injecting through said injection well at least about 0.1 pore volume of an aqueous solution of polyethylenimine having a mean molecular weight of about 600 or less;
    said polyethylenimine reacting with said crude to form an oil-soluble soap, and said soap further reacting with said crude to form a grease-like barrier layer;

injecting at least about 0.5 pore volume of a pushing agent through said injection well to push said crude, from behind said barrier layer, towards said producing well; and producing said crude oil through said producing well.

10. The method in accordance with claim 9, wherein said pushing agent is a viscous aqueous solution.

11. The method in accordance with claim 10, wherein said pushing agent is an aqueous solution of carboxymethylcellulose.

12. The method in accordance with claim 9, wherein said pushing agent is water.

13. The method in accordance with claim 9, wherein about 0.5 pore volume of polyethylenimine solution is injected.

14. The method in accordance with claim 9, wherein the mean molecular weight of the polyethylenimine solution is about 300.

15. The method in accordance with claim 14, wherein the concentration of the polyethylenimine in aqueous solution is from about 0.05% to about 0.1%.

16. The method in accordance with claim 15, wherein the injection of polyethylenimine solution is followed by the injection of at least about 2 pore volumes of water.

17. A method for recovery of acidic petroleum crude oil from an underground formation, which includes injecting into said formation an aqueous solution of from about 0.05% to about 0.10% polyethylenimine having a mean molecular weight of about 600 or less.

* * * * *